July 2, 1940.   F. KLEIN   2,206,609

DIVERTER VALVE

Filed Nov. 15, 1939   2 Sheets-Sheet 1

INVENTOR
FELIX KLEIN
BY
ATTORNEY

July 2, 1940.  F. KLEIN  2,206,609
DIVERTER VALVE
Filed Nov. 15, 1939   2 Sheets-Sheet 2

INVENTOR
FELIX KLEIN
BY
ATTORNEY

Patented July 2, 1940

2,206,609

UNITED STATES PATENT OFFICE 2,206,609

DIVERTER VALVE

Felix Klein, Philadelphia, Pa., assignor to Keystone Brass and Rubber Company, Philadelphia, Pa., a corporation of Pennsylvania Application November 15, 1939, Serial No. 304,470

7 Claims. (Cl. 251—22)

My invention relates to a new and useful diverter valve which is adapted to control or direct the flow to one of two outlets, the normal position of such valve being to keep one of said outlets closed until it is desired to divert the flow temporarily to the other of said outlets, the valve being also adapted to return to the original or normal position automatically.

By way of example, in modern bathrooms provided with showers, and whether such showers are of the type installed in a shower stall or whether they be combined with the bath tub, it is desirable to mix hot and cold water normally to flow into the lower spigot either into the tub or for testing the water temperature before the water is diverted to the overhead shower fixture. In order to accomplish this various devices have been produced but such devices have been more or less complicated and expensive and required packing glands or gaskets which tended to leak and required replacement or repair. Furthermore, such devices have also been objectionable in that their operation involved the manipulation of heavy or resisting parts and it is the object of my invention to produce a diverter valve for use in connection with bathroom fixtures or elsewhere which is extremely simple in construction and in operation, thereby reducing the expense and facilitating the operation.

The construction and operation of my novel invention will be more clearly understood from the following specification and the accompanying drawings in which.

Figure 1:
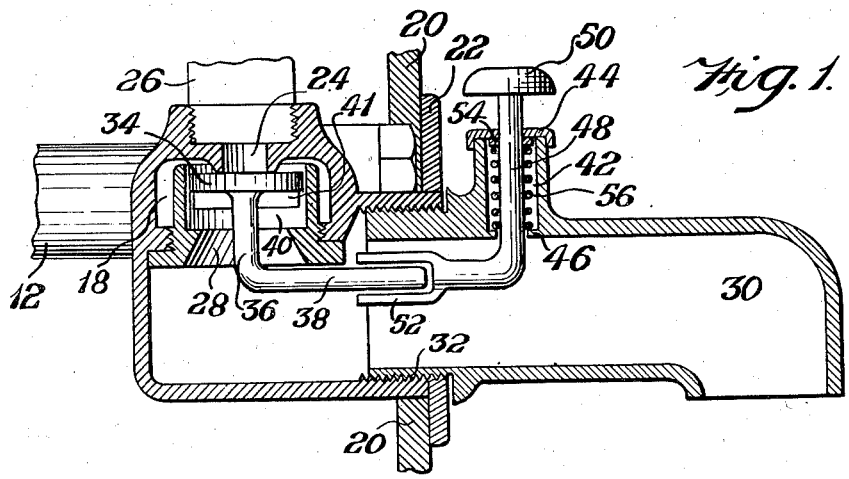
Fig. 1 represents a view partly in vertical section and partly in elevation showing the diverter valve embodying my invention and applied to a bathroom fixture.
Figure 2:
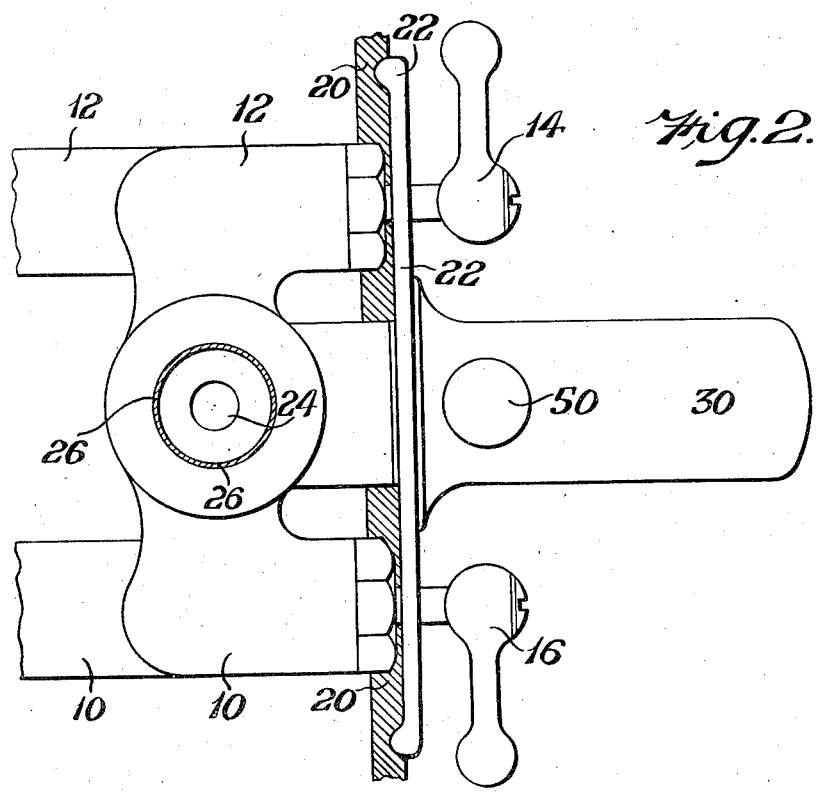
Fig. 2 represents a plan view of the device shown in Fig. 1.
Figure 3:
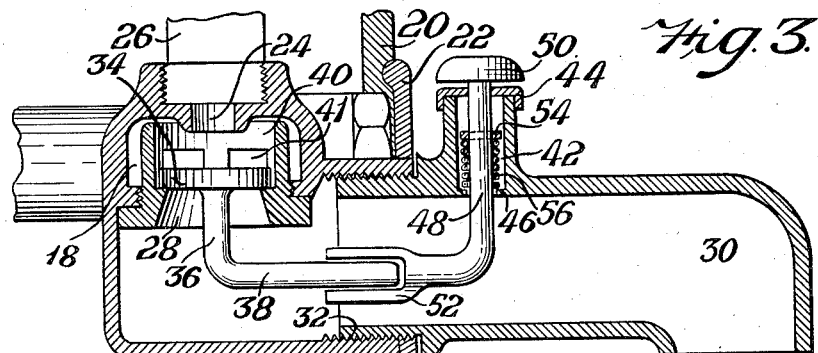
Fig. 3 represents a view similar to Fig. 1 showing the device adjusted for diverting the water to the shower head.

Referring to the drawings in which like reference characters indicate like parts, and particularly with the form of invention shown in Figs. 1 to 3, in which I have shown only as much of the construction as is necessary to illustrate my invention, 10 and 12 designate hot and cold water inlets which are controlled by usual valves (not shown) which valves are operated by the handles 14 and 16 in the usual manner. The hot and cold water from the inlets 10 and 12 flows into a central mixing chamber 18, and preferably but not necessarily the inlets 10 and 12 and mixing chamber 18 and their adjuncts are disposed behind the bathroom wall 20, and the openings, through which the valve stems connected to the handles 14 and 16 project, are preferably covered by the decorative plate 22 in the usual manner. Leading from the mixing chamber 18 is the port 24 which communicates with the pipe leading upwardly to the shower fixture (not shown), and also communicating with the mixing chamber 18 is the lower port 28 which communicates with the spigot 30. It will be noted that the spigot 30 is threaded at 32 to that part of the fixture which is behind the bathroom wall 20 so that it is easily removed if desired. The ports 24 and 28 are alternately closed by the valve plug 34 which is carried by the valve stem 36 extending downwardly a distance sufficient to allow for the vertical reciprocation of the valve plug 34, the stem 36 being then deflected to form the horizontal bar 38. In order to guide the valve plug 34 in its vertical reciprocation I provide the perforated sleeve or spider 40 which communicates through the ports 41 with the mixing chamber 18, the guide 40 being of any desired construction and secured in position in any suitable manner since it simply serves as a bearing for the vertical edge of the valve plug 34 to keep the latter in proper alignment. In the top of the spigot 30 I provide the hollow boss 42 which is provided with a cap 44 and with the inwardly extending bottom flange 46. Passing through the hollow boss 42 is the operating stem 48 which is provided with the outer upper knob 50 and the lower end of which is deflected horizontally and formed into a yoke or sleeve 52, detachably engaging the horizontal extension 38 of the valve stem 36. To the operating stem 48 is secured the washer or stop 54 and between the step 54 and the lower flange 46 is confined the spring 56. As shown in Fig. 1 the spring 56 tends to expand or open and thus acting on the stop 54 it raises the valve stem 48 upwardly thus also upwardly moving the vertical stem 36 and the valve plug 34 into the position in which it closes the port 24 leading to the shower head. This is the normal position of the parts and in this position the water will, when the valve handles 14 and 16 have been turned, flow out through the spigot 30. If it is desired to divert the water to the shower, the knob 50 of the valve stem 48 is depressed against the tension of the spring 56 to bring the parts into the position shown in Fig. 3 and in which the valve plug 34 closes the lower port 28 leading to the spigot 30 thus leaving the port 24 leading to the shower open. In this position the water is diverted from the spigot 30 into the shower fixture. In order not to have to hold the knob 50 down as long as it is desired to divert the water to the shower fixture I have made the tension of the spring 56 such as to be sufficient in the absence of water pressure to raise the stem 48 and valve plug 34 into the position shown in Fig. 1, but at the same time the tension of the spring 56 is not enough to raise the valve plug 34 from the position shown in Fig. 3 to the position shown in Fig. 1 while water is flowing into the mixing chamber 18. Therefore, as long as the valve handles 14 and 16 are in the open position to admit water to the mixing chamber 18, the water pressure plus the weight of the parts overcomes the tension of the spring 56 and the valve plug 34 will remain in the lower position shown in Fig. 3. As soon as the flow of water into the mixing chamber 18 is interrupted or cut off, the tension of the spring will bring the parts back from the position shown in Fig. 3 to the position shown in Fig. 1 so that the next time the valve handles 14 and 16 are open there is no danger of the water emerging through the shower fixture but the water will flow through the spigot. It will be noted that by providing the hollow boss 42, the top of which is on a level with the top of the mixing chamber and which, in any event, is above the spigot 30, and through which the operating stem 48 is made to pass, I eliminate all necessity of packing glands or gaskets since there is no danger of leakage, whereas, if the stem manipulating the valve piston 34 were introduced and manipulated through openings disposed in other parts of the fixture, such as is the case in some devices of this character heretofore known, it will be necessary to provide water-tight packings and gaskets which will inevitably leak and which will always require replacement and repair.

Figure 4:
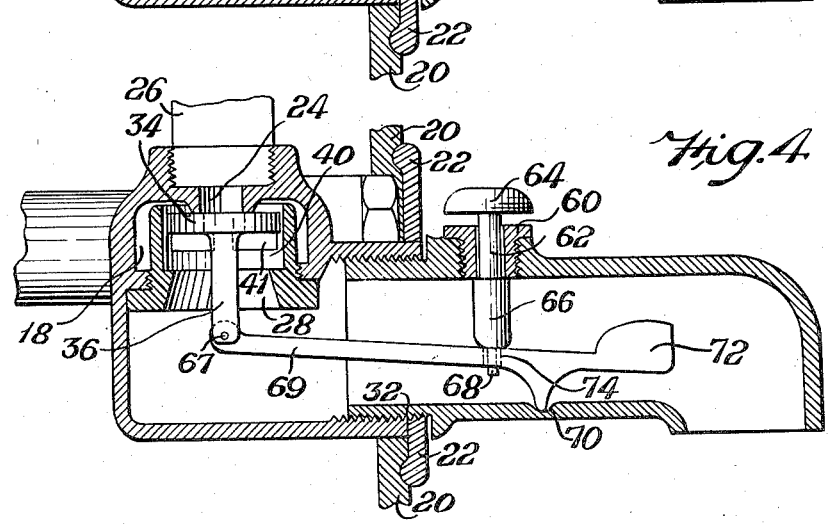
Fig. 4 represents a view similar to Fig. 1 showing a modified form of construction.
Figure 5:
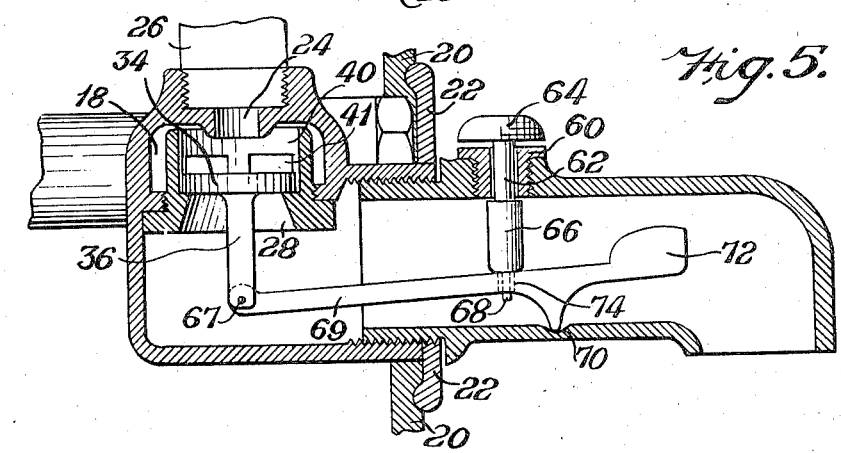
Fig. 5 represents a view similar to Fig. 4 showing the diverter valve adjusted to direct the water to the shower fixture.

In Figs. 4 and 5 I have shown a modified form of construction which, insofar as the spigot, the mixing chamber and the valve plug 34 and its function, is identical with that shown in Figs. 1 to 3 but in which, instead of the hollow boss 42, I provide the threaded plug 60 through which is slidably mounted the operating stem 62 having the knob 64 and having an enlarged portion 66 which terminates in a pin or greatly reduced portion 68. To the vertical stem 36 of the valve plug 34 and in lieu of the horizontal extension 38 I pivot at 67 the lever 69 which is fulcrumed in any suitable manner as at 70 and which is provided with a counter-weighted end 72. The lever 69 is also provided with an opening 74 which serves to guide the lower pin or reduced portion 68 of the operating stem 62. According to this construction the counter-weight 72 serves normally to retain the valve piston 34 in its upper position to close the port 24 and thus shut the water off from the shower. When it is desired to divert the water to the shower the knob 64 is pressed down thus depressing the lever 69 at the fulcrum point 70 into the position shown in Fig. 5 which brings the valve plug 34 to its lower position to close the port 28 leading to the spigot. In this position the weight of the operating stem 60 and its parts 64 and 66 together with the pressure of the water in the mixing chamber 18 serves to retain the valve plug 34 in its lower position, and, when the water has been shut off from the mixing chamber 18, the counter-weight 72 automatically raises the valve plug 34 from the position shown in Fig. 5 to the position shown in Fig. 4.

Having thus described my invention, what I claim as new and desire to secure by Letters Patent is:

1. A diverter valve comprising a valve casing having a mixing chamber formed therein, water connections leading to said mixing chamber, there being an outlet in said mixing chamber adapted to lead to a shower head and another outlet leading from said mixing chamber to a spigot, a valve plug movable in said mixing chamber to close either of said outlets, an arm for actuating said valve plug, said arm extending from said mixing chamber into said spigot, a stem extending through an aperture in the upper side of said spigot and coacting with said arm for actuating said valve plug, and means for normally urging said stem and said arm in one direction for maintaining said valve plug in a position normally closing one of said outlets regardless of the presence or absence of water pressure in said mixing chamber, said means being adapted to retain said valve plug in a position to close the other of said outlets when said valve plug has been moved into said latter position in the presence of water pressure in said mixing chamber.

2. A diverter valve comprising a valve casing having a mixing chamber formed therein, water connections leading to said mixing chamber, there being an outlet adapted to lead from said mixing chamber to a shower head and another outlet leading from said mixing chamber to a spigot, a valve plug movable in said mixing chamber to close either of said outlets, an arm for actuating said valve plug, said arm extending from said mixing chamber into said spigot, a stem extending through an aperture on the upper side of said spigot and coacting with said arm for actuating said valve plug, and means for normally urging said stem and said arm in one direction for maintaining said valve plug in a position normally closing one of said outlets regardless of the presence or absence of water pressure in said mixing chamber, said means being adapted to retain said valve plug in a position to close the other of said outlets when said valve plug is moved into said latter position in the presence of water pressure in said mixing chamber.

3. A diverter valve comprising a valve casing having a mixing chamber formed therein, water connections leading to said mixing chamber, there being an outlet in said mixing chamber adapted to lead to a shower head and another outlet leading from said mixing chamber to a spigot, a valve plug movable in said mixing chamber to close either of said outlets, an arm extending from said mixing chamber into said spigot, a stem extending through an aperture in the upper side of said spigot, said stem being separate from but coacting with said arm for actuating said valve plug, and means for normally urging said stem and said arm in one direction for maintaining said valve plug in a position normally closing one of said outlets regardless of the presence or absence of water pressure in said mixing chamber, said means being adapted to retain said valve plug in a position to close the other of said outlets when said valve plug has been moved into said latter position in the presence of water pressure in said mixing chamber.

4. A diverter valve comprising a valve casing having a mixing chamber formed therein, water connections leading to said mixing chamber, there being an outlet in said mixing chamber adapted to lead to a shower head and another outlet leading from said mixing chamber to a spigot, a valve plug movable in said mixing chamber to close either of said outlets, an arm for actuating said valve plug, said arm extending from said mixing chamber into said spigot, a stem extending through an aperture in the upper side of said spigot and coacting with said arm for actuating said valve plug, and means for normally urging said stem and said arm in one direction for maintaining said valve plug in a position normally closing one of said outlets regardless of the presence or absence of water pressure in said mixing chamber, said means being adapted to retain said valve plug in a position to close the other of said outlets when said valve plug has been moved into said latter position in the presence of water pressure in said mixing chamber, the upper end of said aperture being higher than the upper end of said mixing chamber.

5. A diverter valve comprising a valve casing having a mixing chamber formed therein, water connections leading to said mixing chamber, there being an outlet in said mixing chamber adapted to lead to a shower head and another outlet leading from said mixing chamber to a spigot, a valve plug movable in said mixing chamber to close either of said outlets, an arm for actuating said valve plug, said arm extending from said mixing chamber into said spigot, a stem extending through an aperture in the upper side of said spigot and coacting with said arm for actuating said valve plug, and means for normally urging said stem and said arm in one direction for maintaining said valve plug in a position normally closing one of said outlets regardless of the presence or absence of water pressure in said mixing chamber, said means being adapted to retain said valve plug in a position to close the other of said outlets when said valve plug has been moved into said latter position in the presence of water pressure in said mixing chamber, said spigot being detachably threaded to said valve casing and said stem being entirely separable from said arm.

6. A diverter valve comprising a casing having a mixing chamber formed therein, water connections leading to said mixing chamber, there being an upper outlet adapted to lead from said mixing chamber to a shower head and a lower outlet leading from said mixing chamber to a spigot below said shower head, a valve plug movable in said mixing chamber and adapted to close said upper or said lower outlet, an arm carried by and depending from said valve plug and extending from below said mixing chamber horizontally into the body of said spigot, a stem extending through the upper side of said spigot and having a horizontal extension detachably but operatively engaging the end of said arm, and yielding means acting on said stem for retaining said stem and said valve plug in their uppermost position normally to close said upper outlet.

7. A diverter valve comprising a casing having a mixing chamber formed therein, water connections leading to said mixing chamber, there being an upper outlet adapted to lead from said mixing chamber to a shower head, a lower outlet leading from said mixing chamber to a spigot below said shower head, a valve plug movable in said mixing chamber and adapted to close either of said outlets, an operating lever pivoted at one end thereof to said valve plug and fulcrumed near the other end thereof at a point in the body of said spigot, the last mentioned end of said lever being weighted, whereby said valve plug is constantly urged to its upper position normally to close said upper outlet, and an actuating pin extending through the upper side of said spigot and engaging said lever at a point intermediate said fulcrum point and the pivotal connection of said lever with said valve plug, whereby said lever and said valve plug may be depressed to close said lower outlet, the weight on the end of said lever being greater than the weight of said valve plug but less than the force exerted by the water pressure in said mixing chamber.

FELIX KLEIN.